United States Patent
Phogat et al.

(10) Patent No.: US 11,087,505 B2
(45) Date of Patent: Aug. 10, 2021

(54) WEIGHTED COLOR PALETTE GENERATION

(71) Applicant: Adobe Inc., San Jose, CA (US)

(72) Inventors: Ankit Phogat, Noida (IN); Vineet Batra, Pitam Pura (IN); Sayan Ghosh, Durgapur (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/685,589

(22) Filed: Nov. 15, 2019

(65) Prior Publication Data

US 2021/0150775 A1 May 20, 2021

(51) Int. Cl.
*G06T 11/00* (2006.01)
*G06K 9/62* (2006.01)
*G06K 9/46* (2006.01)
*G06N 20/00* (2019.01)

(52) U.S. Cl.
CPC .......... *G06T 11/001* (2013.01); *G06K 9/4652* (2013.01); *G06K 9/6223* (2013.01); *G06K 9/6256* (2013.01); *G06N 20/00* (2019.01); *G06T 2200/24* (2013.01)

(58) Field of Classification Search
CPC . G06T 11/001; G06T 2200/24; G06K 9/6223; G06K 9/4652; G06K 9/6256; G06N 20/00
See application file for complete search history.

(56) References Cited

U.S. PATENT DOCUMENTS

| | | |
|---|---|---|
| 6,351,557 B1 | 2/2002 | Gonsalves |
| 6,606,166 B1 | 8/2003 | Knoll |
| 10,572,988 B1 * | 2/2020 | Chaturvedi ............. G06T 19/20 |
| 2009/0122075 A1 | 5/2009 | Park et al. |
| 2012/0075329 A1 | 3/2012 | Skaff et al. |
| 2012/0163710 A1 * | 6/2012 | Skaff ....................... G06N 7/005 382/165 |
| 2012/0218572 A1 * | 8/2012 | Kishino ............... H04N 1/6066 358/1.9 |
| 2016/0200137 A1 * | 7/2016 | Walter ..................... B44C 3/12 428/120 |
| 2019/0355155 A1 * | 11/2019 | Shugrina ............... G06T 15/503 |
| 2020/0073969 A1 * | 3/2020 | Kursar ................... G06N 20/00 |
| 2020/0077122 A1 * | 3/2020 | Alakuijala ........... H04N 19/176 |

(Continued)

OTHER PUBLICATIONS

"Youtube, "Color Chameleon"", Retrieved at: https://www.youtube.com/watch?v=m5U5nePn0vg, Nov. 8, 2016, 1 page.

(Continued)

*Primary Examiner* — Grace Q Li
(74) *Attorney, Agent, or Firm* — FIG. 1 Patents

(57) ABSTRACT

In implementations of weighted color palette generation, one or more computing devices implement a generation system which receives input data including an input color palette. A first machine learning model receives the input color palette and generates an unweighted color palette based on the input color palette. A second machine learning model receives the generated unweighted color palette and generates a weighted color palette based on the generated unweighted color palette. The generation system renders the weighted color palette in a user interface.

20 Claims, 9 Drawing Sheets
(6 of 9 Drawing Sheet(s) Filed in Color)

(56) References Cited

U.S. PATENT DOCUMENTS

2020/0204773 A1\* 6/2020 Geese .................. H04N 9/67
2020/0394813 A1\* 12/2020 Theverapperuma ...... G06T 7/55

OTHER PUBLICATIONS

"CIELAB Color Space—Wikipedia", Retrieved at: https://en.wikipedia.org/wiki/CIELAB_color_space, 10 pages.
Chang,"Palette-based Photo Recoloring", ACM Transactions on Graphics (TOG)—Proceedings of ACM SIGGRAPH, Jul. 27, 2015, 11 pages.
Clark,"Simple and Effective Multi-Paragraph Reading Comprehension", Nov. 7, 2017, 11 pages.
Hitchcock,"The Distribution of a Product from Several Sources to Numerous Localities", Journal of Mathematics and Physics, Apr. 1941, 2 pages.
Hu,"Expanding Color Query Results via Image Recoloring", Oct. 15, 2017, 4 pages.
Nguyen,"Group-Theme Recoloring for Multi-Image Color Consistency", Oct. 2017, 10 pages.
Phogat,"Flow-Based Color Transfer from Source Graphic to Target Graphic", U.S. Appl. No. 16/533,308, filed Aug. 6, 2019, 60 pages.
Rubner,"A Metric for Distributions with Applications to Image Databases", Jan. 4, 1998, 8 pages.
"Non-Final Office Action", U.S. Appl. No. 16/533,308, dated Nov. 18, 2020, 8 pages.
"Notice of Allowance", U.S. Appl. No. 16/533,308, dated Mar. 3, 2021, 9 pages.

\* cited by examiner

300

302
Receive an input color palette

304
Generate an unweighted color palette by normalizing color values of the input color palette and using a first machine learning model based on the normalized color values and distribution of colors of color palettes included in training data used to train the first machine learning model

306
Generate a weighted color palette by modeling a context of colors of the generated unweighted color palette using a second machine learning model based on weights of colors of color palettes included in training data used to train the second machine learning model

308
Generate, for display in a user interface, the weighted color palette

Fig. 3

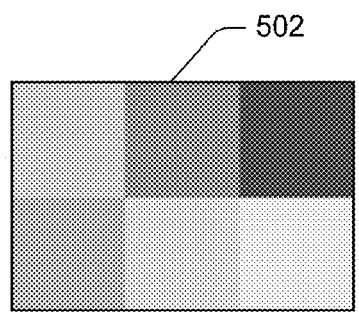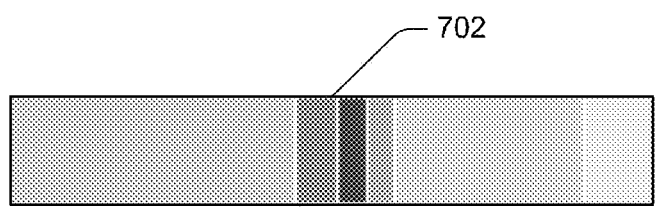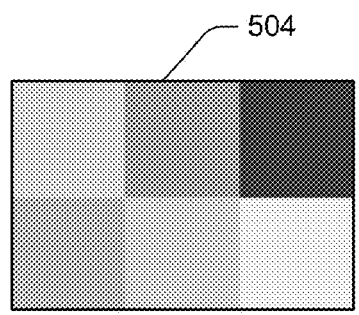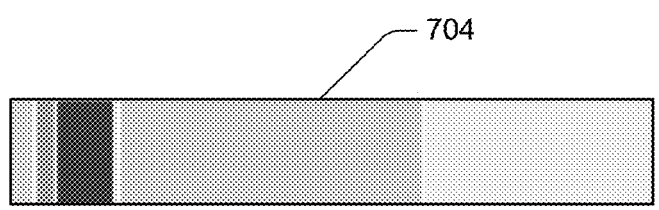
Fig. 7

WEIGHTED COLOR PALETTE GENERATION

BACKGROUND

Color is a primary tool used for expression in digital content. As part of this, color palettes are often employed to portray different themes based on a collection of colors included in the color palettes. The color palettes, for instance, may be used to define a theme, may be used to recolor digital images to be consistent with the theme, and so on. Accordingly, color palettes are one of the primary tools used by digital content creation systems to provide functionality usable by a digital artist to select colors for digital content.

There are a variety of sources that serve as a basis for generating color palettes for use by digital content creation systems. For example, these sources may include color palettes of famous artists or trending color palettes which digital artists can select for use in coloring a digital image. However, most of these color palettes are not weighted. A weighted color palette defines relative amounts of each color of the palette for use in coloring the digital image by the digital content creation systems. For example, a weighted color palette may weight light colors more heavily than dark colors for coloring a digital image in a light colored theme.

Techniques have been developed to generate weighted color palettes using conventional digital content creation systems and an exemplar digital image. These techniques generate a weighted color palette as having colors and corresponding weights based on colors and amounts of the colors in the exemplar digital image. However, the weighted color palette generated using the exemplar digital image and the conventional digital content creations systems may fail to capture a theme (e.g., a style) of a digital artist due to reliance on a single exemplar digital image. Conventional systems and techniques are also limited to generating one weighted color palette from each exemplar digital image which is computationally inefficient.

SUMMARY

Systems and techniques are described for weighted color palette generation. In an example, machine learning models are trained using training data including color palettes used to color digital images. The digital images, for example, may depict digital content having a particular visual style or theme and the color palettes used to color the digital images may correspond to the particular visual style or theme across a plurality of the digital images.

In one example, a first machine learning model is trained to learn color distribution of colors of the color palettes. A second machine learning model is then trained to learn weights of the colors of the color palettes. By training the machining learning models using the color palettes that correspond to the particular visual style or theme, the machine learning models are trained to generate weighted color palettes that can be used to color a target digital image to have a visual theme similar to the particular visual style or theme. In this way, the described systems overcome the challenges of conventional techniques which are limited to reproducing a weighted color palette from a single exemplar digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures may be indicative of one or more entities and thus reference may be made interchangeably to single or plural forms of the entities in the discussion.

FIG. 3 is a flow diagram depicting a procedure in an example implementation in which in input color palette is received and a weighted color palette is generated for display in a user interface.

FIG. 7 is an illustration of a representation of generating weighted color palettes based on unweighted color palettes.

DETAILED DESCRIPTION

Overview

Figure 1:
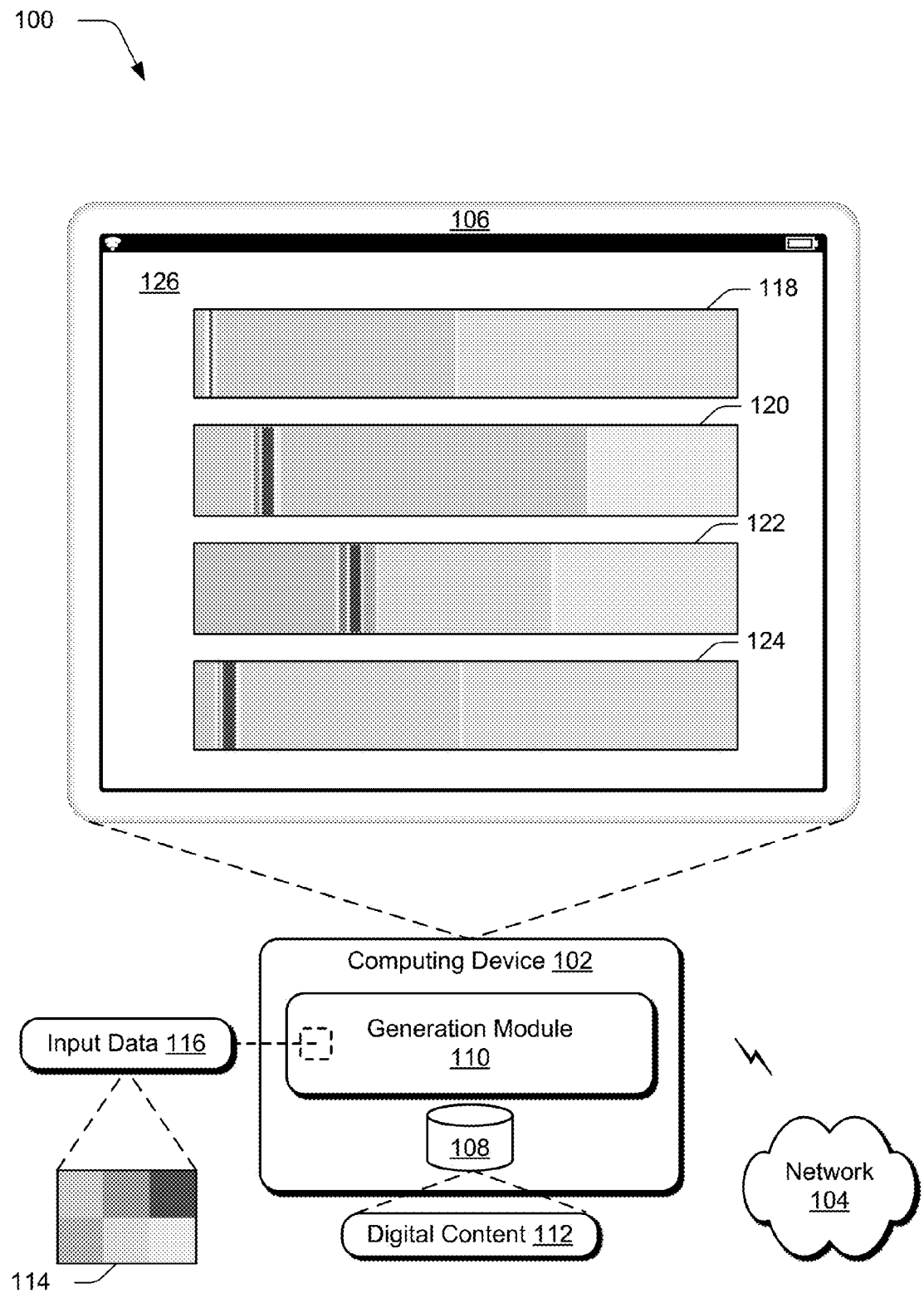
FIG. 1 is an illustration of an environment in an example implementation that is operable to employ digital systems and techniques as described herein.

Systems and techniques are described that employ machine learning for generating weighted color palettes based on a visual style or theme of color palettes used to color digital images. Given previously designed digital images created by an artist, for instance, a generation system described herein may be used to suggest newer and/or diverse color palettes, automatically and without user intervention, while keeping a style employed by the artist intact. This is performed by the generation system by extracting color palettes from the previously designed digital images and learning color distributions and color weights through machine learning to suggest similar weighted color palettes which encapsulate semantically similar color distributions.

In one example, a computing device implements the generation system as including first and second machine learning models. The machine learning models are trained using training data that includes the color palettes used to color digital images. For example, the training data may include digital images having a desirable visual style or theme such as a style of a particular digital artist, and the color palettes used to color the digital images correspond to the desirable visual style or theme as extracted from or otherwise associated with those images.

The first machine learning model is trained to learn color distribution of colors of the color palettes included in the training data. In this manner, the first machine learning model is trained to learn which colors correspond to the desirable visual style or theme. For example, the first model can be trained to learn which colors correspond to the style of the particular digital artist.

The second machine learning model is trained to learn weights of the colors of the color palettes included in the training data. In this way, the second machine learning model is trained to learn which amounts of colors correspond to the desirable visual style or theme. Thus, the machine learning models are trained to generate weighted color palettes that can be used to color a target digital image to have a visual style or theme similar to the desirable visual style or theme.

In an example, the trained first machine learning model receives an input color palette represented in CIELAB color space such that each of the colors of the input color palette is defined by an L value, an A value, and a B value. The generation system generates the unweighted color palette to include colors based on the color distributions of the color palettes used to color the digital images. The L values of the generated unweighted color palette are replaced with the L values of the input color palette. In this way, the unweighted color palette retains the lightness/luminance of the input color palette.

The trained second machine learning model receives the unweighted color palette, and the second machine learning model generates a weighted color palette based on the unweighted color palette and the color weights learned as part of the training. This generated weighted color palette can be used to color a target digital image to have a visual style or theme that is similar to the desirable visual style or theme of the digital images colored by the weighted color palettes included in the training data. The generation system can generate a multitude of weighted color palettes having colors with weights similar to the color palettes included in the training data by adding Gaussian noise to color channels of the input color palette.

The described systems and techniques overcome conventional limitations by generating a multitude of weighted color palettes, which may be based on a single input color palette. The weighted color palettes generated in this manner are usable to color target digital images such that the target digital images have visual styles or themes similar to the desirable visual styles or themes of the digital images colored with the color palettes included in the training data. The generated weighted color palettes can also include features of the input color palette such as lightness/luminance. Thus, the described systems can generate a wide variety of weighted color palettes through simple modification of the input color palette and/or the color palettes included in the training data which is not possible using conventional systems.

For example, the first and second machine learning models can be trained on color palettes used to color digital images created by a digital artist. Once trained, the first machine learning model can generate unweighted color palettes having colors which correspond to a style of the digital artist and the second machine learning model can generate weighted color palettes having weights based on amounts of colors which correspond to the style of the digital artist. In this way, the described systems and techniques can generate new and diverse weighted color palettes while also maintaining the style of the digital artist.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a generation module 110. The storage device 108 is illustrated to include digital content 112.

An example of the digital content 112 is an input color palette 114 which is shown to be included in input data 116. The generation module 110 is illustrated as having, receiving, and/or transmitting the input data 116. For example, the generation module 110 can process the input data 116 to generate weighted color palettes 118-124 which are rendered in a user interface 126 of the display device 106.

Figure 2:
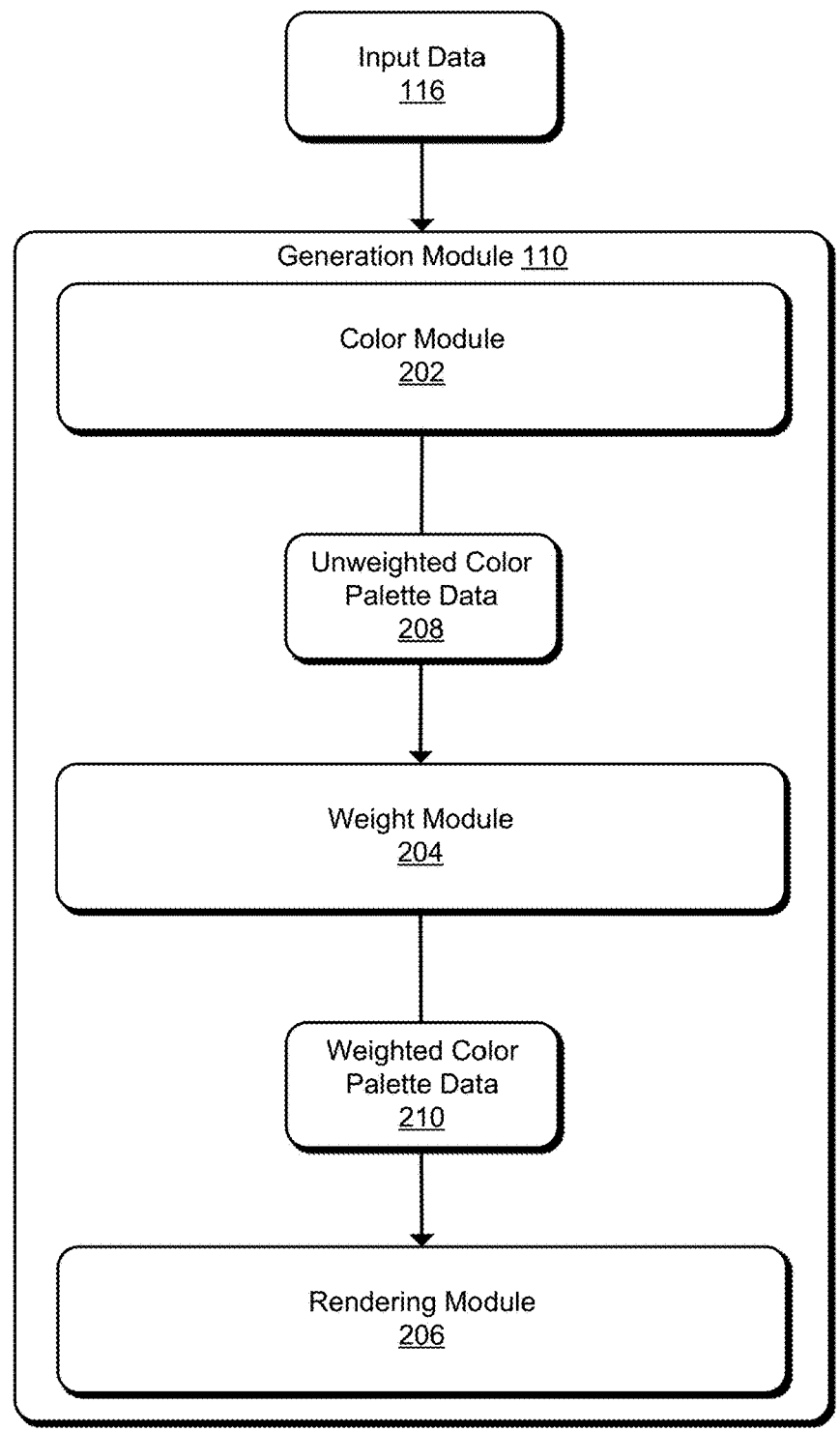
FIG. 2 depicts a system in an example implementation showing operation of a generation module.

FIG. 2 depicts a system 200 in an example implementation showing operation of a generation module 110. The generation module 110 is illustrated to include a color module 202, a weight module 204, and a rendering module 206. The computing device 102 implements the generation module 110 to receive input data 116 which includes the input color palette 114. In some examples, the input color palette 114 may be derived from a digital image or a set of digital images. In these examples, k-means clustering may be applied to the input digital image and the input color palette 114 can be generated based on colors depicted in the input digital image. In other examples, the input color palette 114 can be a user input such as a trending color palette or a color palette used by a famous digital artist.

The color module 202 receives the input data 116 which can describe the colors of the input color palette 114 in CIELAB color space such that each of the colors is defined by an L value, an A value, and a B value. In one example, the color module 202 receives the input data 116 which describes the colors of the input color palette 114 in CIELAB color space with the values normalized between −1 and 1. The color module 202 processes the input data 116 and generates unweighted color palette data 208. For example, the color module 202 can include a machine learning model such as a variational autoencoder which is trained to learn themes of color palettes based on a training dataset.

The color module 202 generates the unweighted color palette data 208 by adding Gaussian noise to A and B values of the colors of the input color palette 114. The color module 202 then uses the trained machine learning model to generate color values. In one example, the color module 202 uses the L values of the colors of the input color palette 114 along with the generated color values to generate the unweighted color palette data 208. The unweighted color palette data 208 describes generated color palettes having colors of equal weight. The color module 202 may be implemented to convert the unweighted color palette data 208 from CIELAB color space to RGB color space for processing by the weight module 204.

The weight module 204 receives the unweighted color palette data 208 which describes unweighted colors in RGB color space and the weight module 204 processes the unweighted color palette data 208 to generate weighted color palette data 210. The weight module 204 can include a machine learning model which is trained to learn weights of colors based on a training dataset. The weight module 204 generates the weighted color palette data 210 by training the machine learning model to learn the importance of each color with respect to all of the colors of the unweighted color palette. The trained machine learning model generates weights for each color in the unweighted color palettes and the weight module 204 generates the weighted color palette data 210 to include the generated weights.

The rendering module 206 receives the weighted color palette data 210 and the rendering module 206 processes the weighted color palette data 210 to render weighted color palettes. For example, the rendering module 206 can render weighted color palettes 118-124 in the user interface 126 of the display device 106. In some examples, the rendering module 206 is implemented to transfer colors of a weighted color palette to a target digital image. In these examples, the rendering module 206 colors the target digital image using colors of a weighted color palette in amounts proportional to weights of the colors. Although described as separate modules, the color module 202, the weight module 204, and the rendering module 206 can be implemented as a single module or implemented in additional modules.

Machine learning models of the generation module 110 can be efficiently trained on training data without using significant processing resources. In one example, a first machine learning model of the generation module 110 may be trained using Adam for 2000 epochs to learn distribution of colors of color palettes included in training data. In another example, a second machine learning model of the generation module 110 may be trained using RMSProp for 2000 epochs to learn weighs of colors of color palettes included in training data. In these examples, the first machine learning model and the second machine learning model can be trained on the training data in under a minute. For example, the computing device 102 can implement the generation module 110 to train the first and second machine learning models without a GPU. Thus, the computing device 102 can include a personal workstation such as a laptop, and generation module 110 can be implemented to generate weighted color palettes such as weighted color palettes 118-124 without sending the weighted color palette data 210 over the network 104 and without receiving the weighted color palette data 210 over the network.

In an example, the computing device 102 implements the generation module 110 to train the first machine learning module on training data which includes color palettes used to color digital images created by a digital artist. The first machine learning model can be trained to learn distribution of colors of the color palettes included in the training data, e.g., using Adam for 2000 epochs. In this way, the first machine learning model is trained to learn which colors correspond to a style of the digital artist. Continuing this example, the computing device 102 implements the generation module 110 to train the second machine learning module on the training data which includes the color palettes used to color the digital images created by the digital artist. The second machine learning module can be trained to learn weights of colors of the color palettes included in the training data, e.g., using RMSProp for 2000 epochs. In this manner, the second machine learning model is trained to learn which amounts of colors correspond to the style of the digital artist. For example, the generation module 110 can receive the input data 116 and the generation module 110 can generate a multitude of weighted color palettes. These weighted color palettes can include new and diverse weighted color palettes which also maintain the style of the digital artist.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

FIG. 3 is a flow diagram depicting a procedure 300 in an example implementation in which in input color palette is received, a weighted color palette is generated, and the weighted color palette is rendered in a user interface. An input color palette is received (block 302). The computing device 102 may implement the generation module 110 to receive the input color palette. For example, the input color palette may be derived from an input digital image. An unweighted color palette is generated by normalizing color values of the input color palette and using a first machine learning model based on the normalized color values and distribution of colors of color palettes included in training data used to train the first machine learning model (block 304). The generation module 110 can generate the unweighted color palette based on the input color palette.

A weighted color palette is generated by modeling a context of colors of the generated unweighted color palette using a second machine learning model based on weights of colors of color palettes included in training data used to train the second machine learning model (block 306). The computing device 102 implements the generation module 110 to generate the weighted color palette based on the generated unweighted color palette. The weighted color palette is generated for display in a user interface (block 308). In one example, the generation module 110 renders the weighted color palette in the user interface.

Figure 4:
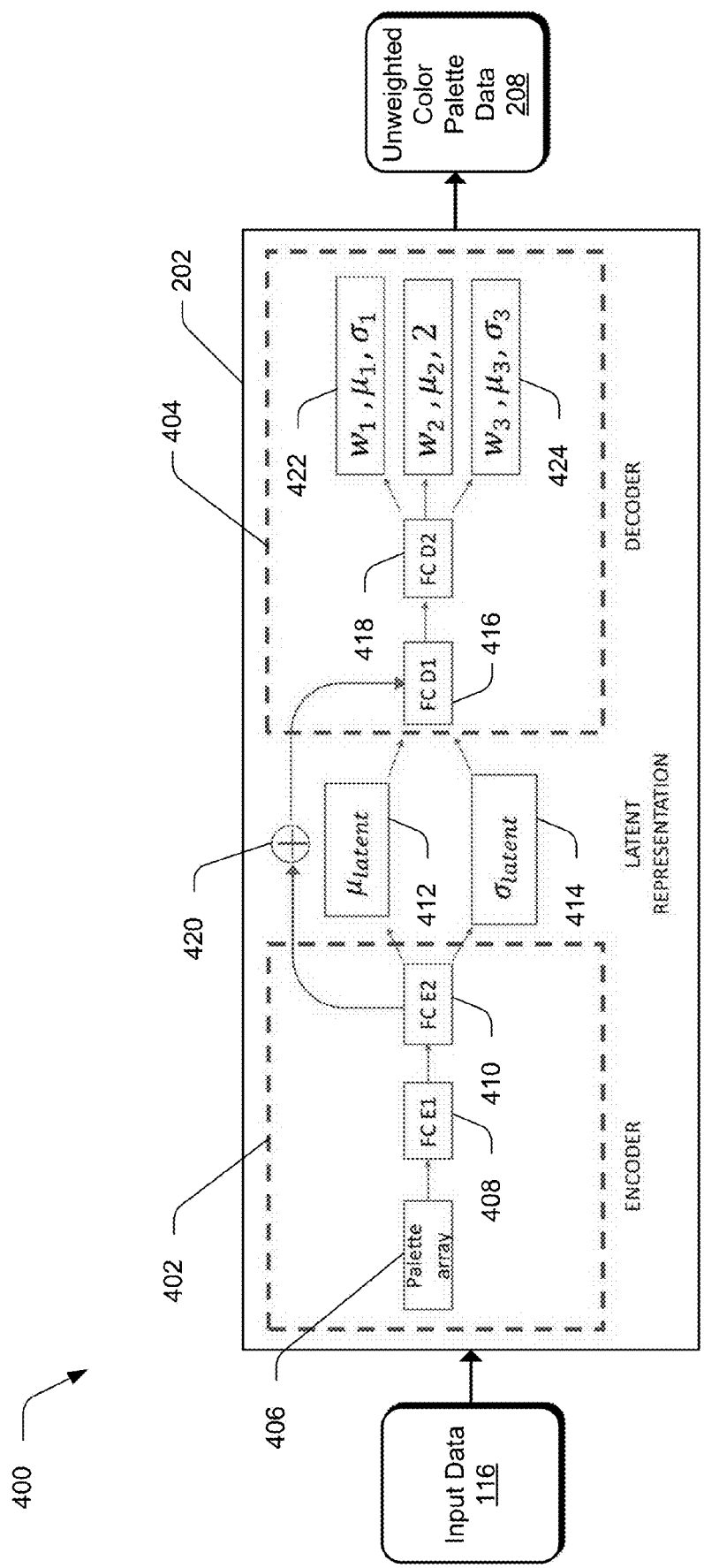
FIG. 4 depicts a system in an example implementation showing operation of a color module.

FIG. 4 depicts a system 400 in an example implementation showing operation of a color module 202. The system 400 includes the color module 202 which is illustrated as receiving input data 116 and outputting unweighted color palette data 208. The color module 202 can include a variational autoencoder which is illustrated as an encoder 402 and a decoder 404. As described previously, the input data 116 includes the input color palette 114 represented in CIELAB color space. The input data 116 includes a vector with an L value, an A value, and a B value for each color of the input color palette 114. In an example in which the input color palette 114 includes 6 colors, the input data 116 includes an 18 dimensional vector.

The encoder 402 receives a palette array 406 which is a 12 dimensional vector including A and B values for each of the 6 colors of the input color palette 114. These A and B values may be normalized in the range of −1 to 1. As shown, the palette array 406 is passed through a first fully connected layer 408 and a second fully connected layer 410 of the encoder 402. In one example, the first fully connected layer 408 and the second fully connected layer 410 may include 64 units each with Exponential Linear Unit (ELU) activation. In this example, ELU activation may be used alternatively to Rectified Linear Unit (RELU) activation because ELU retains values less than zero.

The output of the second fully connected layer 410 is passed to two separate fully connected layers 412, 414. In one example, layer 412 includes a mean of latent space distribution of palettes and layer 414 includes a log of variance of the latent space distribution of palettes. A value is sampled in latent space from layers 412, 414. The decoder 404 receives the sampled value from the latent space and estimates a distribution of the original palette space.

As shown, the decoder 404 includes a first fully connected layer 416 and a second fully connected layer 418 which may include 64 units each with ELU activation. A skip connection 420 is passed from the encoder 402 to the decoder 404. The skip connection 420 simplifies the learning problem by causing the decoder 404 to concentrate on a residual function. The decoder 404 has two outputs 422, 424. Output 422 reflects a mean of the original palette distribution and output 424 reflects a log of variance of the original palette distribution.

A loss function for the variational autoencoder can include the sum of losses of the encoder 402 and the decoder 404. In an example, the encoder 402 is implemented to model the latent space as a normal distribution with mean=0 and variance=1. In this example, the loss for modeling the distribution is KL divergence loss. For example, for normal distribution N(0,1):

$$KL\ \text{Divergence Loss} = \frac{1}{2}\sum_{i=1}^{k}(\sigma_i^2 + \mu_i^2 - \ln(\sigma_i^2) - 1)$$

where: k is the number of dimensions of the latent space (here k=10); $\sigma_i$ is the standard deviation (square root of variance) of the $i^{th}$ dimension; and $\mu_i$ is the mean of the $i^{th}$ dimension.

The decoder 404 is implemented to model the original palette distribution as a Gaussian distribution. For example, the loss is the negative log likelihood:

Negative Log Liklihood $$Loss = \left[w_1 \times \frac{1}{2}\sum_{i=1}^{k}\log(2\times\pi) + \sigma_{1_i}^2 + \frac{x-\mu_{1_i}}{\sigma_{1_i}^2}\right] + \left[w_2 \times \frac{1}{2}\sum_{i=1}^{k}\log(2\times\pi) + \sigma_{2_i}^2 + \frac{x-\mu_{2_i}}{\sigma_{2_i}^2}\right] + \left[w_3 \times \frac{1}{2}\sum_{i=1}^{k}\log(2\times\pi) + \sigma_{3_i}^2 + \frac{x-\mu_{3_i}}{\sigma_{3_i}^2}\right]$$

where: $\mu_{a_b}$ is the mean and $\sigma_{a_b}$ is the standard deviation of the $b^{th}$ dimension of the $a^{th}$ Gaussian distribution in the mixture model.

The total loss is:

Total Loss=KL Divergence Loss+Negative Log Likelihood Loss

The color module 202 generates the unweighted color palette data 208 by adding Gaussian noise to the A and B values and then passing the values with added noise through the decoder 404 to generate unweighted color palettes. The color module 202 is implemented to replace L values of the generated unweighted color palettes with the L values of the input color palette 114 to retain the lightness or the luminance of the input color palette 114 in the generated unweighted color palettes.

Figure 5:
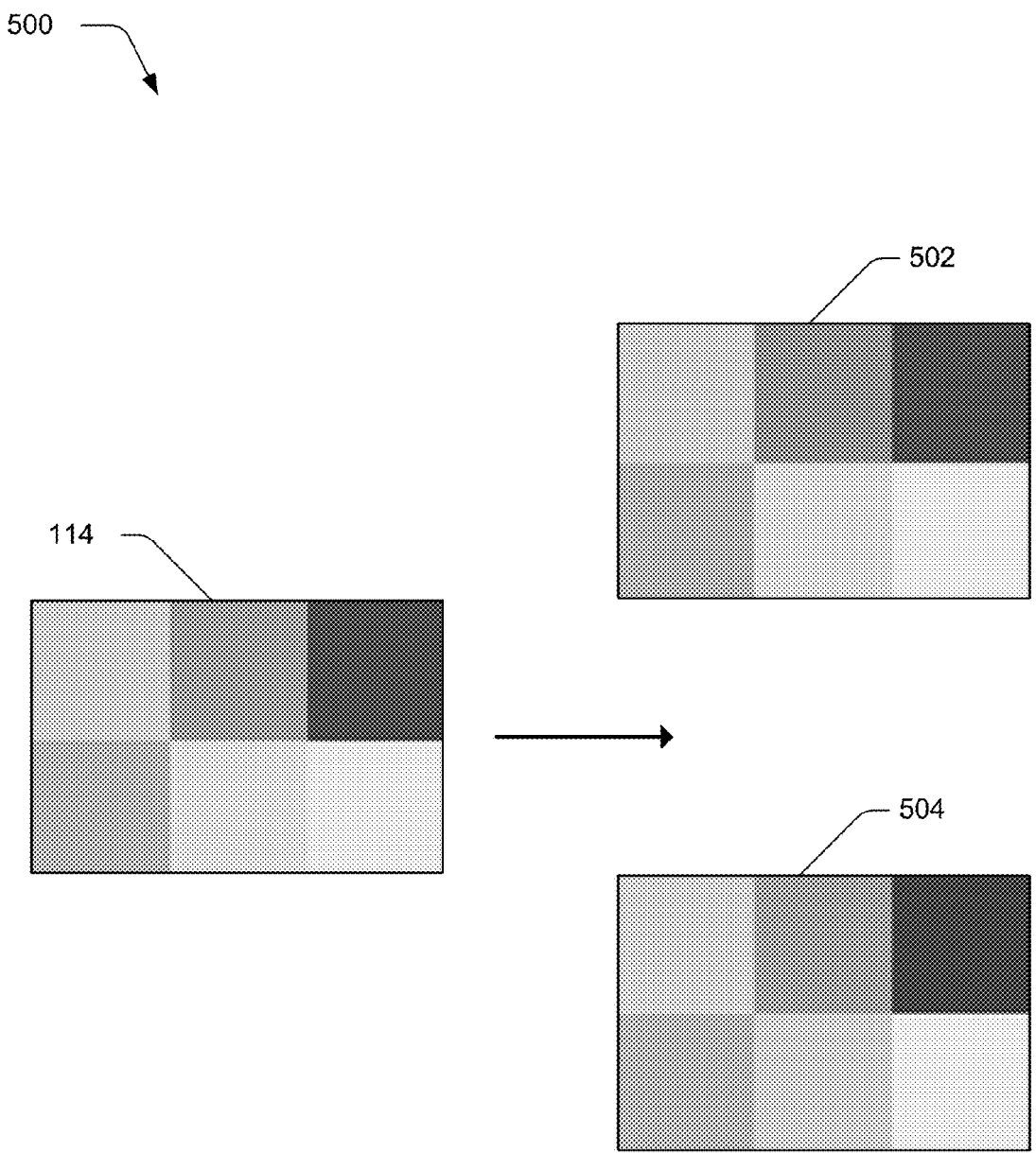
FIG. 5 is an illustration of a representation of generating unweighted color palettes based on an input color palette.

FIG. 5 is an illustration of a representation 500 of generating unweighted color palettes based on an input color palette. The representation 500 includes the input color palette 114 which is received by the color module 202 as part of the input data 116. The color module 202 is implemented to generate unweighted color palettes 502, 504.

Figure 6:
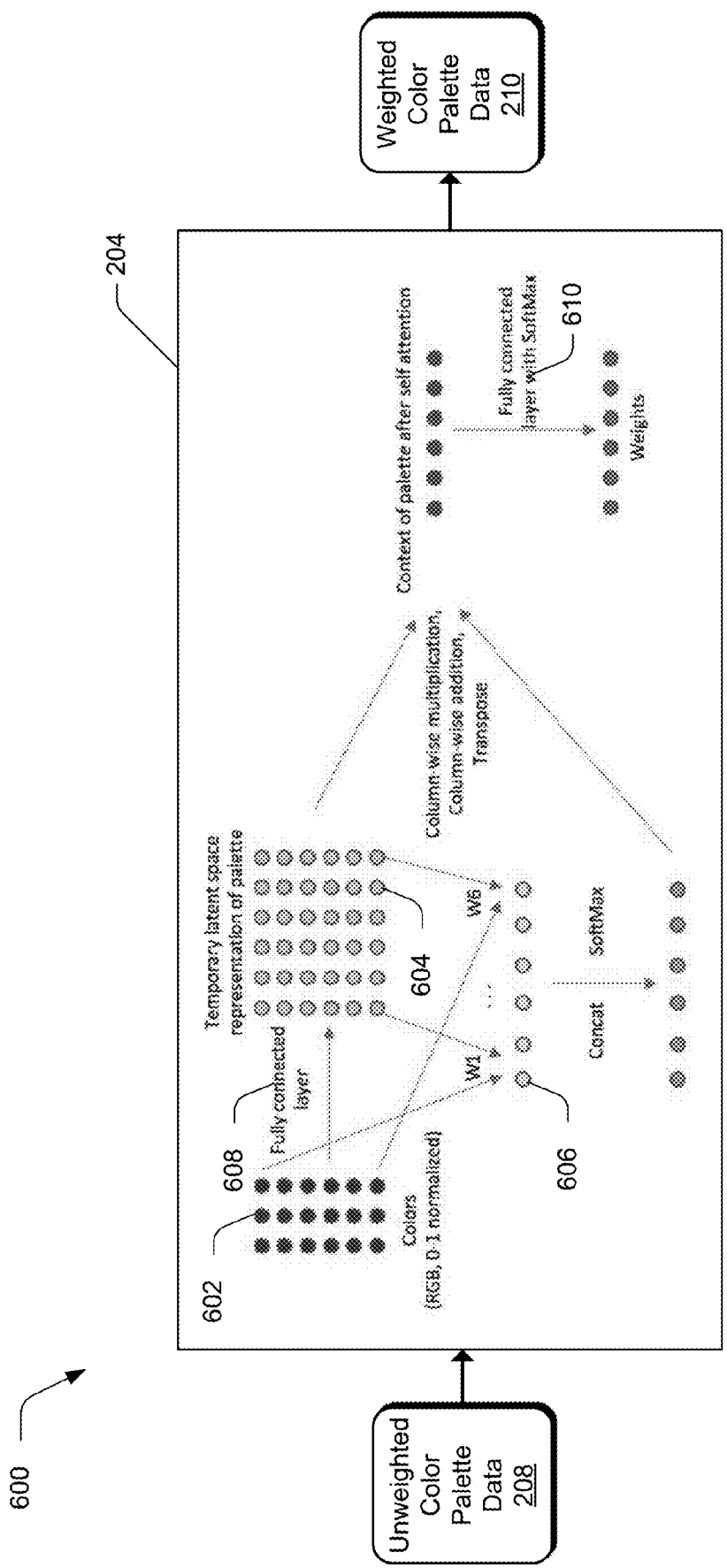
FIG. 6 depicts a system in an example implementation showing operation of a weight module.

FIG. 6 depicts a system 600 in an example implementation showing operation of a weight module 204. The system 600 includes the weight module 204 which is illustrated as receiving unweighted color palette data 208 and generating weighted color palette data 210. As shown, the weight module 204 receives the unweighted color palette data 208 as input 602 which is provided in RGB color space and normalized between 0 and 1. A temporary latent space representation 604 and 6 trainable weight matrices 606 are used to learn the importance of each color with respect to the entire 6 color palette. For example, given a color palette: $C_{6\times3}=C_i$; $1\leq i\leq 6$; a temporary latent space representation $C_{6\times6}'$ is obtained using fully connected layer 608. The 6 trainable weight matrices 606 $W_i$ ($1\leq i\leq 6$; each of shape 3×6) are used to learn the importance of each color. Where $P_i$ is the importance of color $C_i$ and:

$$P_i = C_i \times W_i \times C_i'^T$$

Softmax is used to obtain the final weights of each color and a refined context of the entire color palette C" where:

$$P_i = \frac{e^{P_i}}{\sum_{i=1}^{6} e^{P_i}}$$

$$C'' = \sum_{i=1}^{6} P_i * C_i'^T$$

Final weights W are obtained by passing the context through fully connected layer 610 with softmax activation:

$$W = \text{Softmax}(FC(C''))$$

A loss function can include mean squared loss (L2 loss) between the learned weights (W) and the actual weights (T) such that:

$$L2\ \text{Loss} = \sum_{i=1}^{6} |W_i - T_i|^2$$

FIG. 7 is an illustration of a representation 700 of generating weighted color palettes based on unweighted color palettes. The representation 700 includes unweighted color palettes 502, 504 which the weight module 204 receives as part of the unweighted color palette data 208. The weight module 204 is implemented to generate weighted color palettes 702, 704.

Figure 8:
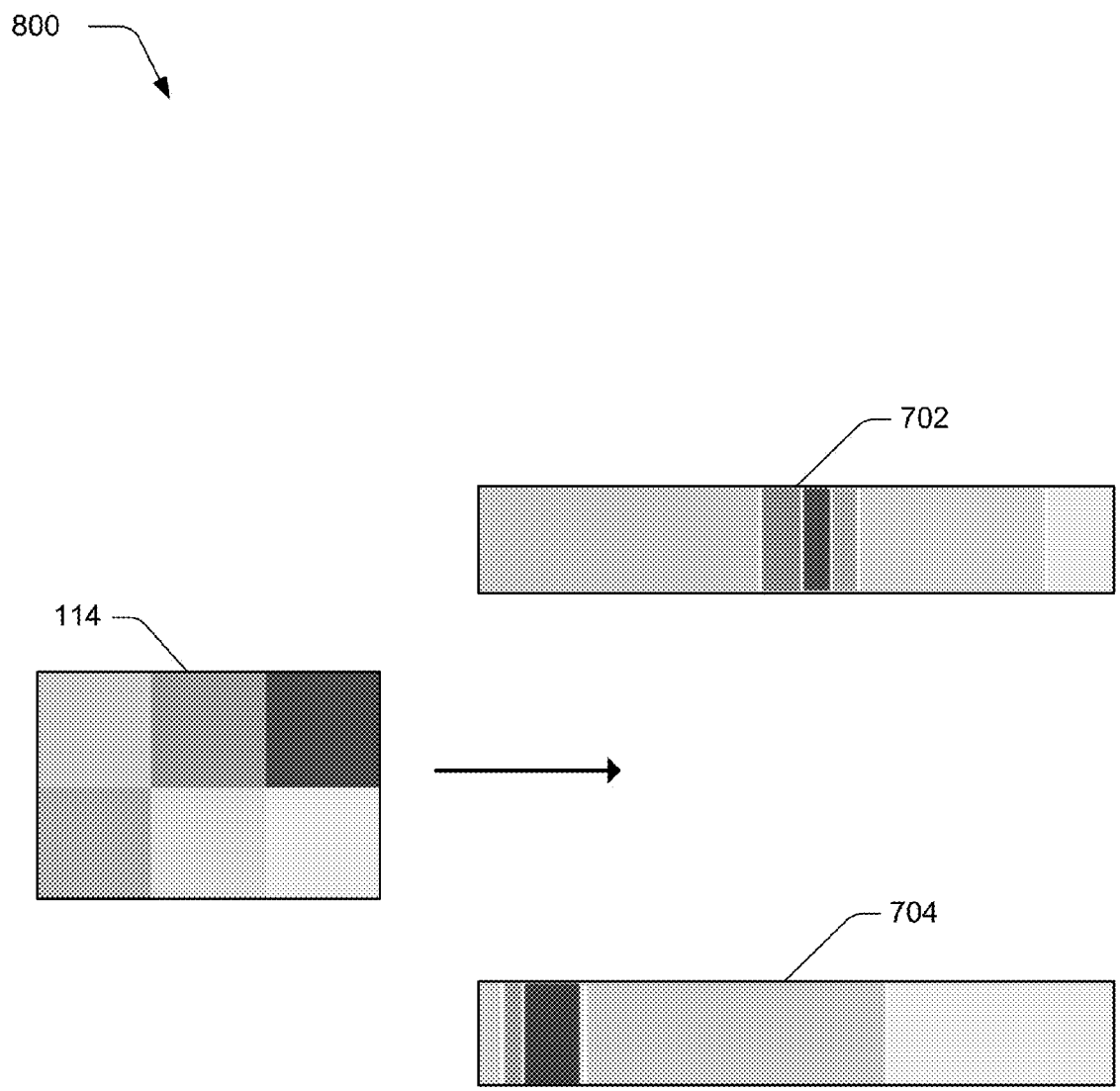
FIG. 8 is an illustration of a representation of generating weighted color palettes based on an input color palette.

FIG. 8 is an illustration of a representation 800 of generating weighted color palettes based on an input color palette. The representation 800 includes the input color palette 114 which the generation module 110 receives as part of the input data 116. The generation module 110 is implemented to generate the weighted color palettes 702, 704.

Example System and Device

Figure 9:
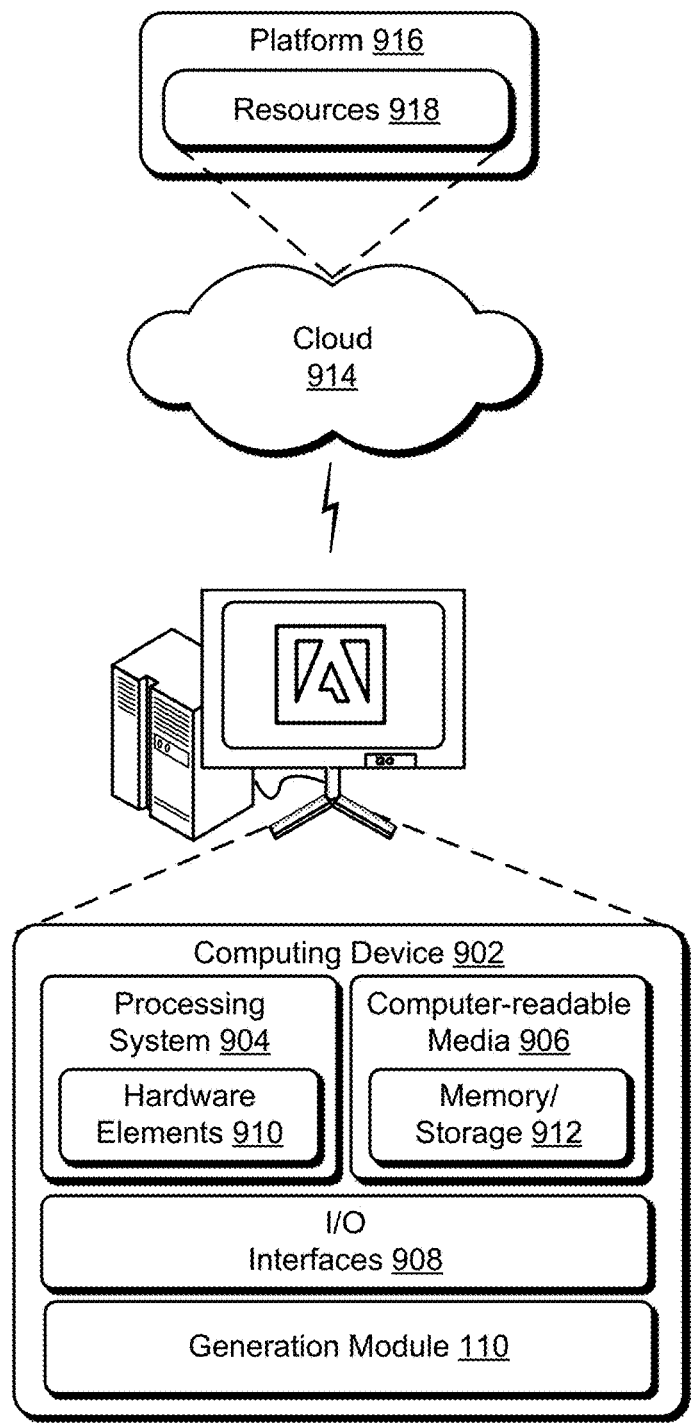
FIG. 9 illustrates an example system that includes an example computing device that is representative of one or more computing systems and/or devices that may implement the various techniques described herein.

FIG. 9 illustrates an example system 900 that includes an example computing device that is representative of one or more computing systems and/or devices that may implement the various techniques described herein. This is illustrated through inclusion of the generation module 110. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources 918 and functions to connect the computing device 902 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although implementations of weighted color palette generation have been described in language specific to structural features and/or methods, it is to be understood that the appended claims are not necessarily limited to the specific features or methods described. Rather, the specific features and methods are disclosed as example implementations weighted color palette generation, and other equivalent features and methods are intended to be within the scope of the appended claims. Further, various different examples are described and it is to be appreciated that each described example can be implemented independently or in connection with one or more other described examples.

What is claimed is:

1. In a digital medium environment to generate a weighted color palette, a method implemented by a computing device, the method comprising:
   receiving, by the computing device, input data describing colors included in an input color palette, each of the colors defined by an L value, an A value, and a B value in a CIELAB color space;
   adding, by the computing device, Gaussian noise to the A value and the B value of each of the colors included in the input color palette;
   generating, by the computing device, an unweighted color palette using a first machine learning model based on the A values and the B values with added Gaussian noise and distributions of colors of color palettes included in training data used to train the first machine learning model;
   replacing, by the computing device, L values of colors included in the generated unweighted color palette with the L values of the colors included in the input color palette;
   generating, by the computing device, the weighted color palette by modeling a context of the colors included in the generated unweighted color palette using a second machine learning model based on weights of colors of color palettes included in training data used to train the second machine learning model; and
   generating, for display in a user interface, the weighted color palette.

2. The method as described in claim 1, wherein the input data describes an input image and the input color palette is derived from the input image.

3. The method as described in claim 2, further comprising applying k-means clustering to the input image.

4. The method as described in claim 1, further comprising transferring weighted colors of the weighted color palette to a target image.

5. The method as described in claim 1, wherein the first machine learning model includes a variational autoencoder.

6. The method as described in claim 1, wherein the generated unweighted color palette is a six color palette.

7. The method as described in claim 1, wherein the first machine learning model and the second machine learning model are separately trained.

8. The method as described in claim 1, wherein the second machine learning model represents colors using an RGB model.

9. The method as described in claim 1, wherein the A values and the B values are normalized in a range of −1 to 1.

10. One or more non-transitory computer-readable storage media comprising instructions stored thereon that, responsive to execution by a computing device in a digital medium environment to generate a plurality of weighted color palettes, cause operations of the computing device including:

receiving an input image;

deriving colors of an input color palette from the input image, each of the colors defined by an L value, an A value, and a B value in a CIELAB color space;

adding Gaussian noise to the A value and the B value of each of the colors included in the input color palette;

generating an unweighted color palette using a first machine learning model based on the A values and the B values with added Gaussian noise and distributions of colors of color palettes included in training data used to train the first machine learning model;

replacing L values of colors included in the generated unweighted color palette with the L values of the colors included in the input color palette;

generating the plurality of weighted color palettes by modeling contexts of the colors included in the generated unweighted color palette using a second machine learning model based on weights of colors of color palettes included in training data used to train the second machine learning model; and generating, for display in a user interface, the plurality of weighted color palettes.

11. The one or more non-transitory computer-readable storage media of claim 10, the operations of the computing device further including transferring weighted colors of a weighted color palette of the plurality of weighted color palettes to a target image.

12. The one or more non-transitory computer-readable storage media of claim 10, wherein the first machine learning model and the second machine learning model are separately trained.

13. The one or more non-transitory computer-readable storage media of claim 10, wherein the first machine learning model includes an encoder and a decoder.

14. The one or more non-transitory computer-readable storage media of claim 13, wherein a skip connection is passed from the encoder to the decoder.

15. In a digital medium environment to generate a weighted color palette, a system comprising:

a color module implemented at least partially in hardware of a computing device to:
  receive input data describing colors included in an input color palette, each of the colors defined by an L value, an A value, and a B value in a CIELAB color space;
  add Gaussian noise to the A value and the B value of each of the colors included in the input color palette;
  generate an unweighted color palette based on the A values and the B values with added Gaussian noise and distributions of colors of color palettes included in training data used to train a first machine learning model; and
  replace L values of colors included in the generated unweighted color palette with the L values of the colors included in the input color palette;

a weight module implemented at least partially in the hardware of the computing device to:
  receive the generated unweighted color palette; and
  generate a weighted color palette by modeling a context of the colors included in the generated unweighted color palette based on weights of colors of color palettes included in training data used to train a second machine learning model; and a rendering module implemented at least partially in the hardware of the computing device to generate, for display in a user interface, the weighted color palette.

16. The system as described in claim 15, wherein the rendering module is further implemented to transfer weighted colors of the weighted color palette to a target image.

17. The system as described in claim 15, wherein the unweighted color palette is a six color palette.

18. The system as described in claim 15, wherein the weight module represents colors using an RGB model.

19. The system as described in claim 15, wherein the first machine learning model includes an encoder and a decoder.

20. The system as described in claim 19, wherein a skip connection is passed from the encoder to the decoder.

* * * * *